United States Patent
Taylor et al.

(10) Patent No.: US 12,397,235 B2
(45) Date of Patent: Aug. 26, 2025

(54) BUTTON SEQUENCE MAPPING BASED ON GAME STATE

(71) Applicant: Sony Interactive Entertainment Inc., Tokyo (JP)

(72) Inventors: Michael Taylor, San Mateo, CA (US); Yasunori Matsui, San Mateo, CA (US); Yurika Kondo, Tokyo (JP); Mihee Kang, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 32 days.

(21) Appl. No.: 18/340,222

(22) Filed: Jun. 23, 2023

(65) Prior Publication Data

US 2024/0424406 A1    Dec. 26, 2024

(51) Int. Cl.
*A63F 13/67*    (2014.01)
*A63F 13/40*    (2014.01)

(52) U.S. Cl.
CPC .............. *A63F 13/67* (2014.09); *A63F 13/40* (2014.09)

(58) Field of Classification Search
CPC .................................. A63F 13/40; A63F 13/67
See application file for complete search history.

(56) References Cited

U.S. PATENT DOCUMENTS

| | | | |
|---|---|---|---|
| 2010/0138798 A1* | 6/2010 | Wilson ............... | G06T 7/285 715/863 |
| 2013/0260884 A1* | 10/2013 | Challinor .............. | A63F 13/533 463/31 |
| 2013/0263251 A1 | 10/2013 | Fleizach et al. | |
| 2015/0138068 A1 | 5/2015 | Howard et al. | |
| 2016/0041622 A1 | 2/2016 | Mattice et al. | |
| 2018/0001205 A1* | 1/2018 | Osman .................... | A63F 13/67 |
| 2018/0157333 A1 | 6/2018 | Ross et al. | |
| 2020/0005026 A1 | 1/2020 | Andersen et al. | |
| 2020/0147501 A1 | 5/2020 | Mahlmeister et al. | |
| 2020/0241574 A1 | 7/2020 | Lin et al. | |
| 2021/0295836 A1* | 9/2021 | Iwase ..................... | G10L 15/22 |
| 2024/0424390 A1 | 12/2024 | Taylor et al. | |

FOREIGN PATENT DOCUMENTS

WO    2018090060 A1    5/2018

OTHER PUBLICATIONS

Lv et al., "Deep Learning for Intelligent Human-Computer Interaction", Applied Sciences, Dec. 22, 2022.

"International Search Report and Written Opinion", dated Aug. 28, 2024, from the counterpart PCT application PCT/US24/31890.

* cited by examiner

*Primary Examiner* — Thomas H Henry
(74) *Attorney, Agent, or Firm* — Fish & Richardson P.C.

(57) ABSTRACT

A machine learning-based model is configured to make inferences about computer game actions to execute based on dynamic, varying player gestures and to translate those game actions into input sequence macros. In some instances, the button sequence mapping for the macros can even dynamically change based on game state so that different macros for the same computer game action might be inferred by the model depending on game state.

12 Claims, 7 Drawing Sheets

BUTTON SEQUENCE MAPPING BASED ON GAME STATE

FIELD

The disclosure below relates generally to machine learning models that map gestures to computer game actions to execute, such as through button sequences macros determined based on computer game state.

BACKGROUND

As recognized herein, one of the technical challenges facing computer game developers and players is the need for intuitive and efficient game control that allows players to execute complex in-game actions with ease and sometimes in tandem with other game actions. As also recognized herein, game controllers often include various buttons, triggers, and analog joysticks, which can be overwhelming for new, novice, and/or young players. Even for experienced, mature players, these controllers may not always provide the most natural or efficient means of controlling in-game actions.

SUMMARY

The disclosure below further recognizes that static gesture control, where a player uses predetermined gestures as static commands regardless of game situation, may not always be sufficient or intuitive for different people of different ages, tendencies, and game experience levels. Nor do these types of static arrangements account for game context. The static gesture input may therefore not be processed correctly or executed correctly.

Accordingly, in one aspect an apparatus includes at least one processor assembly programmed with instructions to dynamically map a player gesture to an input sequence macro based on a game state of a computer game. The at least one processor assembly is also programmed with instructions to input the input sequence macro to the computer game.

In various examples, the player gesture may include a gesture in free space as identified based on input from a camera. Also in various examples, the input sequence macro may include a series of inputs related to video game controller input.

Additionally, in some example implementations the at least one processor assembly may be programmed with instructions to execute a trained model to infer the input sequence macro based on a current menu state of a menu of the computer game. So, for example, the at least one processor assembly may be programmed with instructions to execute the trained model to infer the input sequence macro based on inputs to navigate, according to the current menu state, the menu to an item correlated to the player gesture. The current menu state may become a previous menu state based on input of the input sequence macro to the computer game, and the at least one processor assembly may be programmed with instructions to revert the menu to the previous menu state subsequent to and based on inputting the input sequence macro to the computer game.

Still further, if desired the at least one processor assembly may be programmed with instructions to execute a trained model to infer the input sequence macro based on a current state of a computer game character. Additionally or alternatively, the at least one processor assembly may be programmed with instructions to execute a trained model to infer the input sequence macro based on a current state of progress within the computer game and/or a current position within the computer game.

As a specific example implementation, the at least one processor assembly may be programmed with instructions to execute a trained model to infer the input sequence macro based on an event of the computer game. The event may include a currently-transpiring event and/or a past event that occurred within a threshold amount of time of a current time within the computer game.

Additionally, the at least one processor assembly may be programmed with instructions to dynamically map the player gesture to the input sequence macro based on tracking the eyes of a player performing the player gesture.

In certain example embodiments, the at least one processor assembly may be programmed with instructions to input the input sequence macro to the computer game to control a first game character based on a determination that a player performing the player gesture is looking at the first game character. The at least one processor assembly may also be programmed with instructions to input the input sequence macro to the computer game to control a second game character based on a determination that the player is looking at the second game character. The second game character may be different from the first game character.

In another aspect, a method includes dynamically mapping a player gesture to an input sequence macro based on a game state of a computer game, inputting the input sequence macro to the computer game, and controlling the computer game according to the input sequence macro.

In certain examples, the input sequence macro may include a series of inputs related to video game controller input.

Also in certain examples, the method may include executing a trained model to infer the input sequence macro based on a current menu state of a menu of the computer game, based on a current state of a computer game character, and/or based on an event of the computer game.

In still another aspect, a system includes at least one computer medium that is not a transitory signal. The at least one computer medium includes instructions executable by at least one processor assembly to execute a machine learning (ML) model to translate a free space gesture to a sequence of controller inputs based on a game state of a computer game. The sequence of controller inputs are an output of the ML model that is generated based on input to the ML model of data associated with the free space gesture. The instructions are also executable to input the translated sequence of controller inputs to the computer game.

In certain examples, the game state may be a current game state. Here the instructions may be executable to present an indication to a player of the computer game that a command associated with the gesture cannot be executed in the current game state responsive to the current game state being an inapposite game state for executing the computer game in conformance with the translated sequence of controller inputs.

If desired, the system may include the at least one processor assembly.

The details of the present application, both as to its structure and operation, can be best understood in reference to the accompanying drawings, in which like reference numerals refer to like parts, and in which:

DETAILED DESCRIPTION

Figure 1:
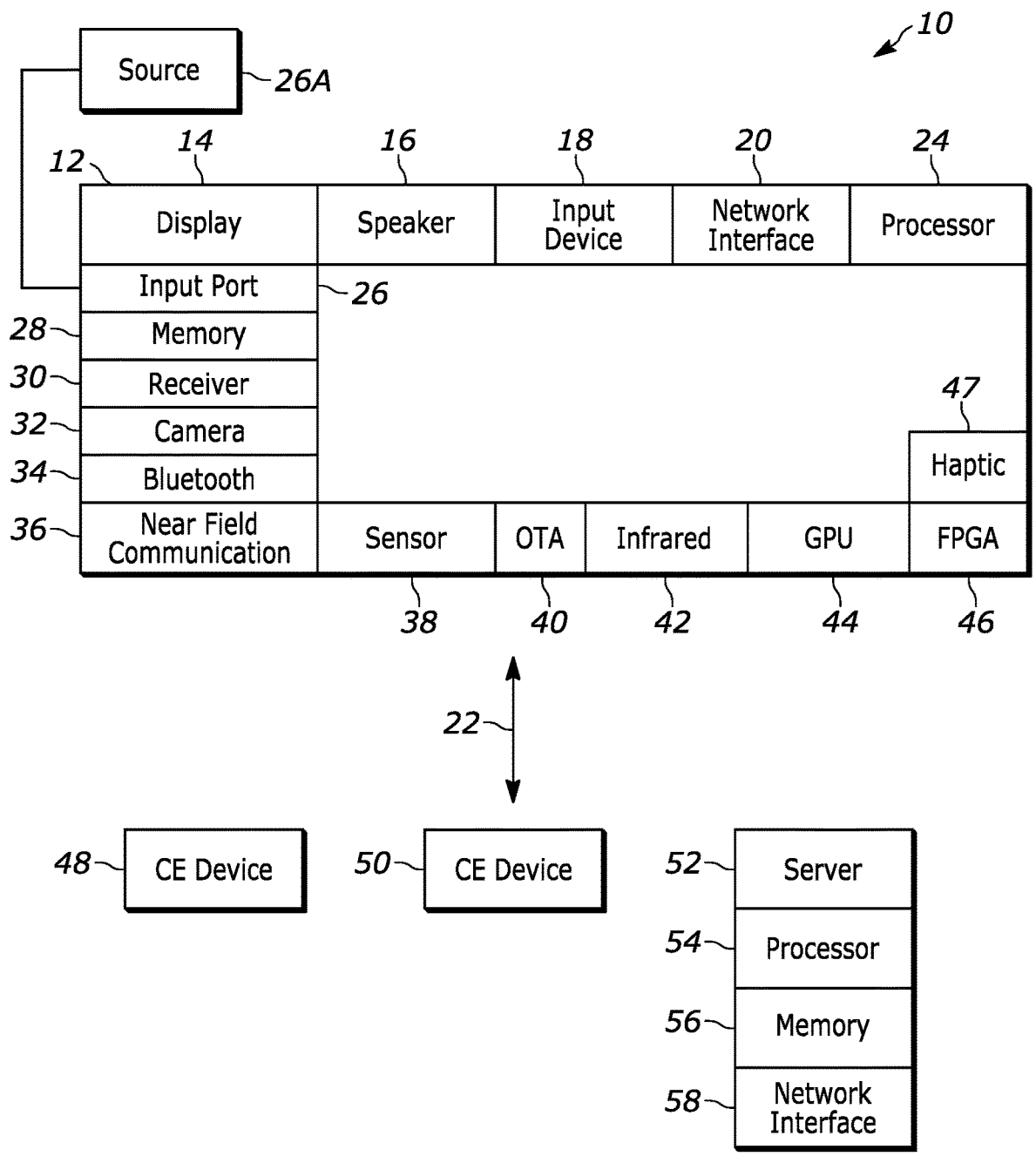
FIG. 1 is a block diagram of an example system consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor assembly may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled 5G ("smart") telephone, a tablet computer, a notebook computer, a head-mounted device (HMD) such as smart glasses or other wearable computerized device (e.g., AR or VR headset), a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a, when implemented as a game console, may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

With the foregoing in mind, among other things, the disclosure below relates to technologies that enable more natural and dynamic control of computer games for adapting to individual player preferences and playstyles. These technologies entail more than gesture recognition of predefined, static gestures that the system has been configured to recognize and already knows to statically translate into a particular static game action using a pre-defined gesture library.

To this end, machine learning-based artificial intelligence (AI) models may be used that dynamically map player gestures to in-game actions. The model(s) may be established by convolutional neural networks (NNs), recurrent NNs, hidden Markov models, support vector machines, etc. Such models may provide a more immersive and engaging gameplay experience by allowing players to control their in-game characters and actions through dynamic, natural body movements and gestures rather than relying on pre-defined gestures or even traditional button-based input devices. By training these models on datasets of player gesture data and corresponding ground truth game actions, the AI model(s) can map varying player gestures to in-game actions in real-time, resulting in a more responsive and context-aware system. For instance, two different gestures involving different body parts and motions might still be mapped to the same in-game action.

Furthermore, the incorporation of game state information into these models can further enhance these models. By taking into account factors such as the current cursor position on a game menu or the player's virtual character position within the computer game, the AI model can dynamically map natural gestures to in-game actions that are most appropriate for the given situation. So, for instance, the same intuitive gesture might be mapped to different in-game actions depending on game state. This in turn can provide effective execution of gesture-based computer game commands notwithstanding dynamic and varying gesture input and game context combinations. It can also allow game developers to create new and innovative computer game designs and execution environments that leverage the unique capabilities of the below AI-driven, gesture-based control systems.

AI-based ML models consistent with present principles may employ various machine learning techniques, such as supervised learning, unsupervised learning, and/or reinforcement learning. These techniques may allow the model to continually improve its mappings and adapt to new gestures and game states. Present principles may be implemented in various gaming platforms, including but not limited to consoles, personal computers, and mobile devices.

As a specific example, suppose a parent and two children are playing a video game. There may be an ML system that is processing the game video stream to understand in-game events and game character state. There may also be an ML system for understanding player gestures and mapping player intention to either controller input or in-game actions, or those two ML systems may be combined into one ML system doing multiple things. Either way, the parent may assign a specific task to each child, such as assigning drinking health potions to child A and assigning summoning a horse to child B. The parent themselves may be using the controller to play the game.

The system may therefore monitor all three players, and when it detects that child A is attempting to trigger the in-game action of drinking a health potion, the system may input the correct button combo (macro) to the video game engine to perform the in-game action. Likewise, when the system detects that child B is attempting to summon the horse, the system may input the correct controller button sequence to summon the horse. The correct button sequence may include, for example, switching the game's quick use menu to the correct item (health potion or horse whistle), and then inputting the specific button/select command to use that item from that menu position/cursor location. The system may also remember the game state before the input sequence was invoked via gesture and restore to the previous state once the in-game action is completed (e.g., to avoid interrupting the parent using the controller and wishing to the menu to remain in its previous state).

As another example, the ML system may additionally or alternatively use an internal system application programming interface (API) call to invoke actions independently from the button sequences. In some examples, this may involve an API at the system or console level rather than within the game execution environment/engine.

Either way, if the in-game action is not doable or possible when the gesture is performed, a visual indication of some sort may be shown on the display (e.g., you can't summon the horse while in a cave in this game). The system may track child A and child B separately to be able to distinguish them if they move around. In terms of reading intention, either the children may make up the gesture and demonstrate it to the ML system prior to engaging in the game instance, and/or the ML system may infer when to take the action without needing to be trained on a specific action through body language, eye tracking, in game events, and/or game character state. In some specific examples, task assignment may be done by the parent first performing the action on the controller through a series of button presses, and then demonstrating intention through a gesture to assign it to a specific child.

In certain instances, the parent may even label/designate the gestures beforehand that are to be mapped to specific commands/functions in the execution environment. Additionally or alternatively, real-life gestures may be mapped in real time on the fly to similar in-game gestures/commands the video game character can perform, and this may be done without prior configuration of the game engine/gesture recognition model (e.g., without a reference library of predetermined gestures that can be used as input).

If desired, gestures and button presses can be executed simultaneously. Additionally or alternatively, if the same command comes from both gesture input and button press input, then the system can take the one that happened or was received first in time. A single player/user might even do both gesture and controller input at the same time to concurrently input different commands in an efficient manner, where the gesture could be one that does not require the player to take his/her hands off the controller since the player might be concurrently providing different input for a different command via the controller while the gesture is also provided.

Additionally, in some implementations the system might only accept gesture input as a gesture bypass, sometimes the system might only accept controller input, and sometimes the system might accept both gesture and controller input. This can vary based on game configuration, game events, position within the game/virtual world, etc.

Still further, present principles may be used to control one virtual character or two virtual characters within the game. So, for example, a single player could control his/her friend's character in the same game environment (e.g., rather than the main character being played by the player themselves) to correct something the friend does wrong. Determining which character to control may be determined by the system by executing eye tracking to identify at which character the player is looking onscreen while performing a gesture and then directing the corresponding command to the character being looked at onscreen.

Further describing return/restoring to a previous game state, in certain specific examples this might include the game restoring a quick menu to a previous state (e.g., restoring to a previously-operative menu item). Since the system is using button sequences/macros to navigate, the system could use reverse sequences/macros for reverse menu navigation in legacy games too. Additionally or alternatively, to revert the system may save game state data outside of the game execution environment, such as saving in memory/RAM, so that the system can access that data later to snap back to the previous state using the data. In some cases, the system may even wait to revert to a previous game state until reaching a time when the same button press that is input by the system to restore to the previous state would not also be used for something else the player might input at that time but to perform a different game action.

Present principles further envision different button sequence mappings for the same gesture/intent, where the mapping dynamically changes depending on game state. The system might use a translation layer to do so since this could involve contextual awareness and the same action/intent might require different button sequences/macros at different times depending on where the player is currently at in the game/menu. This feature can also be used for legacy games that were made without gesture control incorporated into the game engine itself.

In addition to computer gaming implementations such as 2D gaming and virtual reality gaming, present principles may also be implemented in other areas as well, including non-gaming virtual reality, augmented reality, and other motion capture technological areas. But in terms of computer games specifically, present principles can be used in various types of computer games including, but not limited to, action, adventure, role-playing, strategy, and simulation games. The dynamic mapping of player gestures to game actions can thus provide a more immersive and intuitive gaming experience for different types of games, allowing players to interact with the game in a more natural and engaging manner.

ML models consistent with present principles can be integrated into the game software and/or embodied as a separate module that communicates with the game software to receive game state information and provide the mapped game actions.

The player gesture data can be collected from various sources, such as motion capture devices, cameras, laser rangefinders, and/or other sensors capable of detecting and recording player movements.

Thus, a dynamic and adaptive ML system can be trained and used to map player gestures to in-game actions based on the current game state, making the system more intuitive to each user notwithstanding differences in intuition itself, ensuring that the system remains adaptable and responsive to a diverse range of player movements and indeed a diverse range of players themselves.

Figure 2:
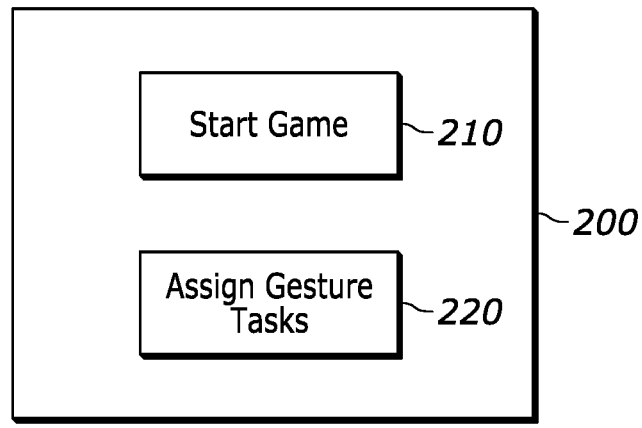
FIG. 2 shows an example graphical user interface (GUI) that may be presented on a display by a gaming computer to begin a process for assigning gesture tasks to one or more players consistent with present principles.

Reference is now made to FIG. 2. Suppose a player is about to start playing a computer game. The game instance might have already been loaded by the console or other computer system, or the user may have at least already provided a command to do so. Responsive to either one, the graphical user interface (GUI) 200 of FIG. 2 may be presented on a connected display, such as a computer monitor, television, smartphone display, etc. The GUI 200 may include a first selector 210 that may be selected to actually initiate gameplay, while a second selector 220 may be selected to initiate a process where the player can assign gesture tasks to that player and/or others consistent with present principles.

Figure 3:
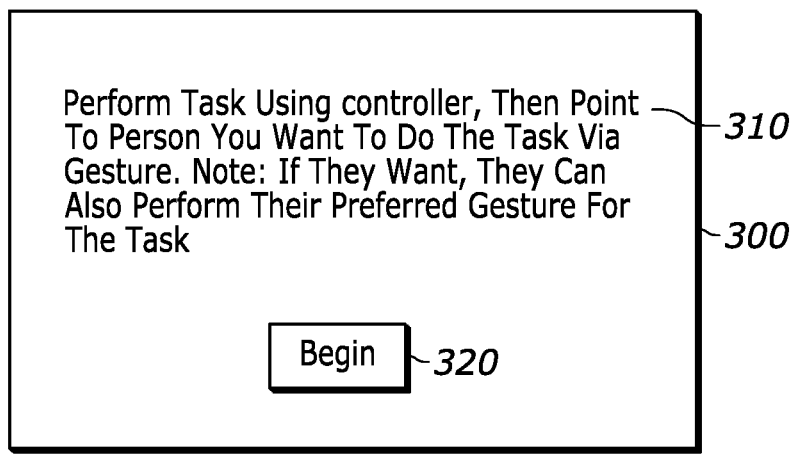
FIG. 3 shows an example GUI with a prompt instructing a player to perform a desired computer game action using a video game controller, with the GUI also prompting the player to gesture at a person for which gesture input of the same game action should be monitored in the future consistent with present principles.

Accordingly, responsive to selection of the selector 220, the system may present the GUI 300 of FIG. 3. As shown, the GUI 300 may include a prompt 310. The prompt 310 may instruct the player to perform the computer game action to be executed using a video game controller that might include different buttons and joysticks for game control. The prompt 310 may also instruct the person to, within a threshold time of receipt of the controller input indicating the computer game action to execute, point in free space (e.g., using an index finger on a hand) to the person that the player wants the system to monitor for gesture input of the same underlying command. The player might therefore gesture at himself/herself or gesture at another person locally present with the player in the same physical location. Also, note that the threshold period of time may be non-zero but sufficiently short so as to avoid false positives where the player might gesture unrelatedly toward someone else in the player's environment without meaning to command the system to monitor that person. As such, the threshold amount of time may be ten seconds, for example.

As also shown in FIG. 3, in some instances the prompt 310 may indicate to the player that the gestured-to person can also perform their own preferred gesture for the command as part of the gesture assignment process in advance of gameplay beginning for the system to then monitor for performance of that specific gesture itself. This may help increase device confidence and accuracy in identifying and executing gesture commands.

Then once the player is ready to begin the process of controller input of a specific game command and then pointing toward the person for which the system should monitor for gesture performance of the same command, the player may select the begin selector 320 through touch input, controller/cursor input, voice command, etc.

Figure 4:
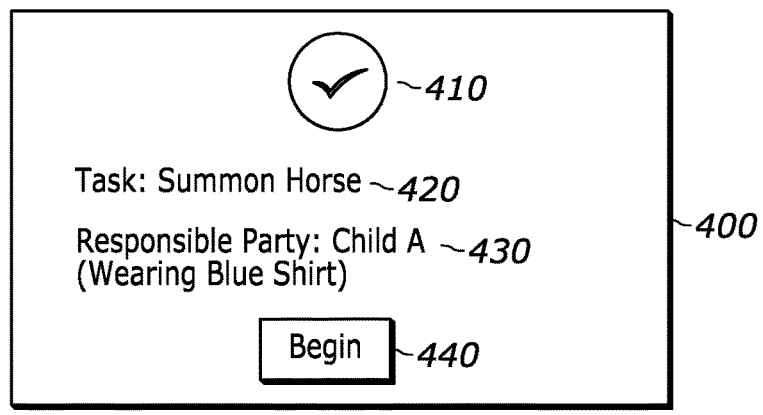
FIG. 4 shows an example GUI prompting the player that the process has been successfully completed, with the GUI also including a button to start gameplay consistent with present principles.

Then once the player selects the selector 320 and the system detects the player gesturing toward a given person to which gesture-based input of a game action/command should be assigned (e.g., using input from a camera, computer vision, and gesture recognition), the GUI 400 of FIG. 4 may be presented. As shown in FIG. 4, the GUI 400 may include a green check mark icon 410 indicating a gestured-to person has been assigned gesture-based input of a particular game action. The GUI 400 may also include a field 420 indicating the respective game action, which in this case is summoning a horse. The GUI 400 might also include a field 430 indicating the identified person at which the player gestured. Facial recognition and other methods might be used to identify that person by name or, in the present instance when a name cannot be identified, the person may be distinguished based on physical characteristics identified for the person based on the camera input. The example in the present instances is that the person is a child (designated by default by the system as "Child A") and is wearing a blue shirt.

Figure 5:
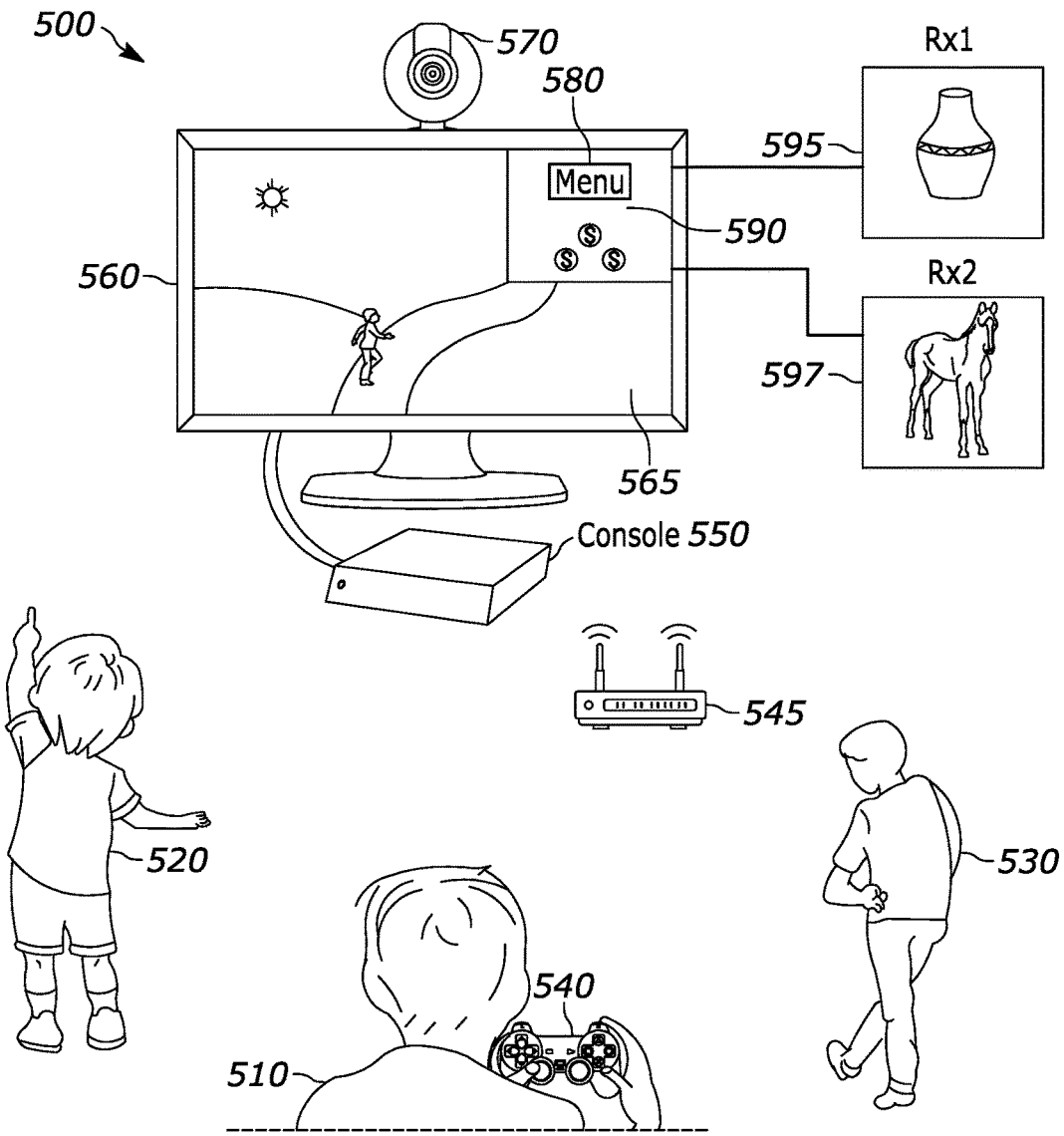
FIG. 5 shows a schematic of multiple players playing a video game using controller-based and gesture-based input consistent with present principles.

Then when the player is ready, the player may select the begin selector 440 to command the system to begin executing the loaded game instance so that gameplay can begin. FIG. 5 thus shows a schematic of a living room environment 500 in which three people who are playing the game instance together are located. Using the parent and two children example from above, a parent 510, child 520, and child 530 are shown. The parent 510 is using a computer game controller 540 to provide analog and/or digital controller-based input, via wireless communication 545, to a gaming console 550 that is connected to a television 560 presenting the visual game content 565 and that is executing the game instance itself. Note that the wireless communication 545 might be Bluetooth communication, Wi-Fi communication, or another suitable wireless communication type.

FIG. 5 also shows that at least one camera 570 may be mounded within the real-world physical environment, such as on top of the television 560, and may be in wired and/or wireless communication with the console 550 to provide images to the console 550. The console 550 may therefore use input from the camera 570 to execute computer vision, gesture recognition, and other types of image processing algorithms to track movements of the three players 510, 520, and 530 in free space.

As such, the console 550 may identify the player 520 performing a gesture in free space using body parts such as hands and arms, torso, head and neck, and even legs and feet. Assume the gesture is interpreted by the console 550 as a command to summon a horse according to the example above. In this example, to summon the horse the player 520 would otherwise have to navigate a quick menu 580 presented on the display (using a controller) to the correct picture-in-picture screen showing the horse to then select the horse for summoning. With this in mind, note that the current menu state of the menu 580 is not set to the horse summoning screen but rather a points or coins screen 590, with current menu state itself being an example of a current game state consistent with present principles.

As also shown in FIG. 5, insets 595 and 597 demonstrate other menu screens of the same menu that may be navigated to for selection of the associated game action. In the present instance, inset 595 and its indication of "Rx1" indicates that by placing the game cursor on the menu 580 and then providing a single joystick input to the right or a single selection of a directional right button (from the controller 540), the player may change the quick menu from its current screen to a potion screen as shown. Also in the present instance, inset 597 and its indication of "Rx2" indicates that by placing the game cursor on the menu 580 and then providing two joystick inputs to the right or two selections of a directional right button from the controller, the player may change the quick menu from its current screen to a horse summoning screen.

Accordingly, upon identifying the gesture input from player 520 to summon the horse, the system/console 550 may dynamically determine a button sequence macro to generate and input into the game engine to command the game engine to self-navigate to the horse summoning screen represented by inset 597 from whatever the current menu state is and to then select the horse summoning action from that screen. Accordingly, here based on the current menu state, the macro that is input to the game may be selection of the game menu 580, then two successive right directional inputs, and then a selection input for horse summoning. However, note that if, for example, the current menu state were that of inset 595 instead, the macro that is input to the game may be different and, as such, may be selection of the game menu 580, a single right directional input, and then the selection input. Thus, macros may be dynamically generated on the fly so that regardless of game state and game context, the intent behind the gesture is realized.

However, present principles also acknowledge that in certain game situations/contexts, a given command may not be available for execution. For instance, there might be a game rule that one cannot summon a horse while in a cave. With this in mind, reference is now made to the overlay GUI 600 of FIG. 6. The GUI 600 might therefore be presented, for example, responsive to recognizing gesture input of a game command which cannot be executed at the current time based on current game state.

Figure 6:
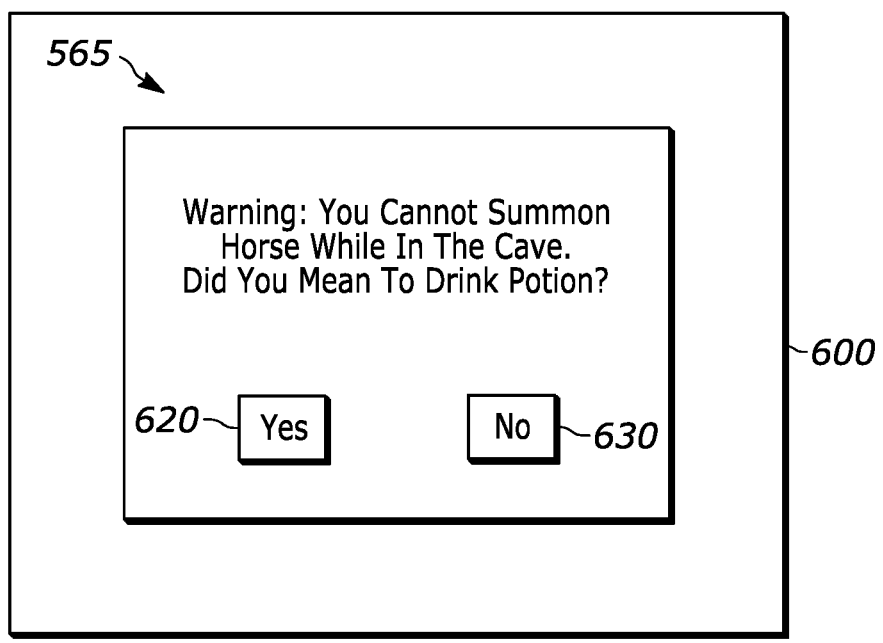
FIG. 6 shows an example GUI prompting a player that a certain game action inferred from a gesture cannot be performed based on a current game state and requesting clarifying user input, which might then be used to train an ML model consistent with present principles.

As shown in FIG. 6, the GUI 600 may be opaquely or semi-transparently overlaid on the visual content 565 and may include a warning prompt 610 indicating that the horse cannot be summoned while the virtual character(s) of the game that are being controlled by the players 510-530 are located in the virtual cave of the game. The prompt 610 may also ask whether the player 520 meant to provide gesture input of a command to drink a potion instead. A yes selector 620 may therefore be selected to provide affirmative input to this question while a no selector 630 may be selected to provide negative input to this question. This input may therefore be used as a label for additional training of the machine-learning based model that was used to correlate the player's gesture to a horse summon action in the first place. For example, if the player selects the selector 620, then the model misinterpreted the gesture command and can undergo additional training for better inferences in the future (e.g., train that the player gesture in this instance should be correlated to ground truth potion drinking). Or if the player selects the selector 630, the model may additionally train to reinforce that the gesture-to-game action was correctly inferred but was simply not possible based on the current game state.

Also note that if the user selects the selector 620 (e.g., only once), the model may not only be trained based on that input but that selection may also establish a command to the game for the player's character to drink the potion itself as an in-game action. This in-game action may be input as a macro determined on the fly by the system consistent with present principles.

Figure 7:
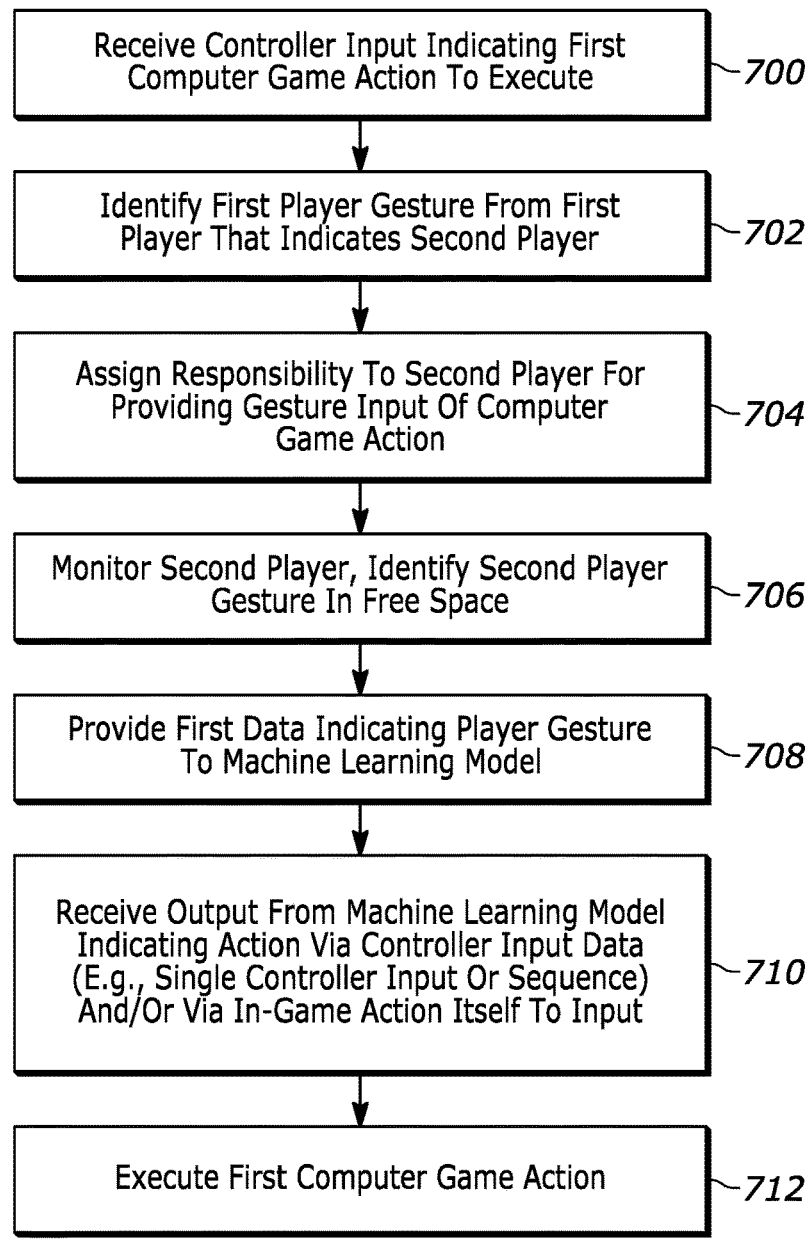
FIG. 7 shows example overall logic that may be executed by a processor assembly consistent with present principles to infer game actions based on gesture data.

Referring now to FIG. 7, it shows example logic that may be executed by one or more devices consistent with present principles. For example, steps in the logic of FIG. 7 may be executed by a personal computer, gaming console, and/or Internet-based cloud gaming server alone or in any appropriate combination. Note that while the logic of FIG. 7 is shown in flow chart format, other suitable logic may also be used.

Beginning at block 700, while executing a video game or as a process for loading one, the device may receive controller input indicating a first computer game action to execute. Like the example above, this may be done as part of a process to subsequently assign gesture input of the same computer game action to a given player. Thus, from block 700 the logic may proceed to block 702 where the device may, within a threshold non-zero time of receipt of the controller input indicating the first computer game action to execute, identify a first player gesture performed in free space. The first player gesture may be performed by a first player (e.g., the player that provided the controller input received at block 700) and indicate a second player different from the first player. The device may thus identify the second player as the one to perform the corresponding gesture in free space in the future. As such, the device may assign responsibility to the second player for providing gesture input of the first computer game action in the future based on receipt of the initial controller input from the first player and the first player gesture provided during this setup process.

Thereafter, the logic may proceed to block 706. At block 706 the device may, based on assigning responsibility to the second player for providing gesture input of the first computer game action, monitor the second player during execution of a computer game to identify a second player gesture in free space as performed by the second player (e.g., gesture(s) using arms, hands, legs, feet, torso, etc.). The second player gesture may be identified using input from a camera imaging the second player and execution of computer vision, gesture recognition, action recognition, and/or other suitable techniques.

The logic may then proceed to block 708 where the device may provide first data indicating the player gesture as input to a machine learning (ML) model configured to make inferences about computer game actions to execute based on player gesture data. The first data itself may be generated via feature and boundary detection, gesture recognition, and action recognition, for instance.

From block 708 the logic may then proceed to block 710. At block 710 the device may receive an output from the ML model that indicates the first computer game action to execute as inferred/correlated by the ML model using the first data. The output may therefore indicate the first computer game action to execute via controller input data, such as indicating a single controller input to input to the computer game or indicating a controller input sequence to input to the computer game (e.g., a macro determined based on current game state). If a sequence/macro is used, the controller input sequence may relate to one or more of controller button input, controller trigger input, and controller directional input (e.g., as provided via an analog joystick on the controller).

Additionally or alternatively, the output may indicate the first computer game action to execute via a predetermined in-game action to input direct to the computer game without expressing it as a controller/button combination per se. So, for example, the predetermined in-game action may be input via a command line to the computer game as would be generated based on the corresponding button sequence itself.

In either case, it is to be understood that the output from the ML model is an inference of the computer game action itself as provided by an activation layer of the ML model or as otherwise generated using an activation function of an output layer of the ML model, with the activation/output layer itself may have one or more nodes. Thus, rather than a mere static gesture/gesture type being recognized and then be used by a rules-based algorithm to identify a corresponding computer game action to execute using a relational database correlating identified static gestures to respective static game actions, the ML model may be used to dynamically identify the action to execute based on whatever dynamic, preferred gesture the monitored player may have provided. As such, the ML model may be trained on at least one set of data to make such inferences, with the at least one set of data including pairs of player gesture data and respective ground truth game actions to execute. The dataset may include data from multiple players so that the model can recognize and interpret a diverse range of gestures.

Then responsive to receiving the output from the ML model at block 710, the logic may proceed to block 712. At block 712 the device may then, based on the output from the activation/output layer, execute the first computer game action itself.

Figure 8:
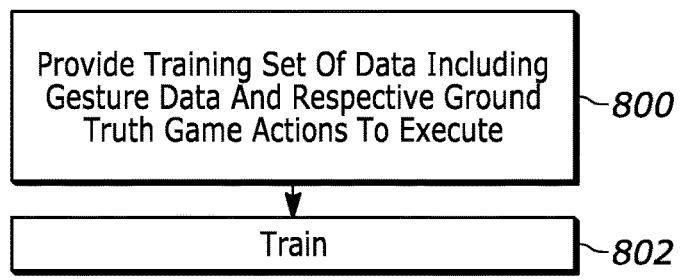
FIG. 8 shows example training logic executable by a processor assembly for training an ML model to operate consistent with present principles.

The logic of FIG. 8 further illustrates via additional logic that may be executed by the device(s) to train the ML model before deployment and/or for additional training after deployment. Beginning at block 800, the logic may provide the at least one set of data that includes the player gesture data and respective ground truth game actions to execute. The logic may then proceed to block 802 to train the ML model using the at least one set of data. Again note that the ML model may include neural networks, decision trees, and/or support vector machines, and the training itself may include supervised, unsupervised, and/or reinforcement learning. As an example, for supervised learning the ML model may be trained using labeled data (the labeled ground truth game actions), where each respective training pair/group includes a player gesture and its corresponding ground truth game action. The model may learn to map gestures to actions by minimizing the difference between its predictions and the ground truth actions. Accordingly, once trained, the ML model can be used to predict game actions for new, unseen player gestures.

As another example, for reinforcement learning, the AI model may learn to map player gestures to game actions by interacting with the game environment and receiving feedback in the form of rewards or penalties. The model may thus learn to optimize its mapping strategy to maximize the cumulative reward over time. So here too the trained ML model can be used to predict game actions for new, unseen player gestures.

What's more, regardless of training implementation, in some instances the ML model can also be trained for player-specific customization, where the model learns to adapt its macro mapping strategy to the individual preferences and playstyles of different players. To do so, the model may be trained on data collected from a specific player and thus incorporate player-specific information into the model's input features to render a particular model version to be used for that player.

Figure 9:
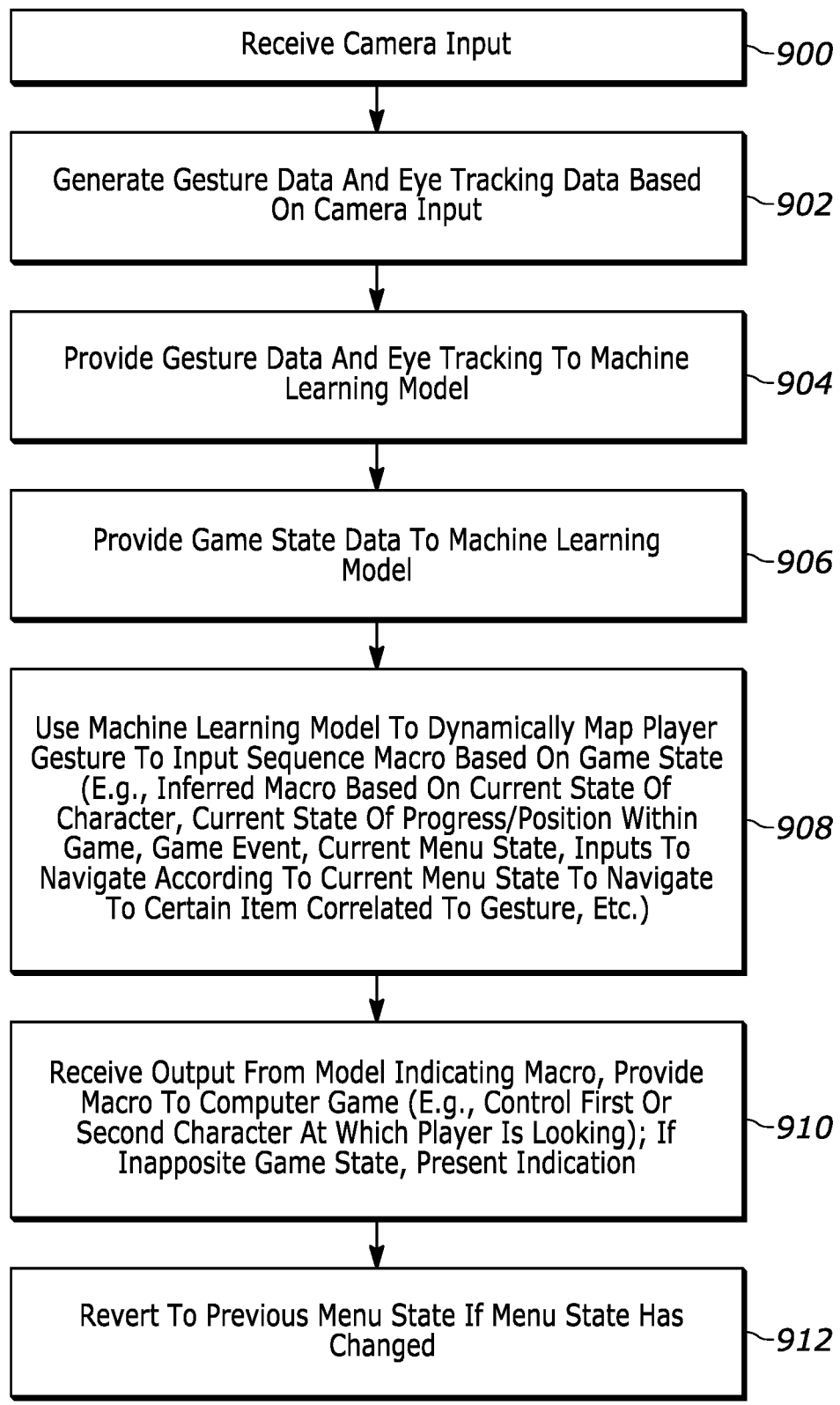
FIG. 9 also shows example overall logic that may be executed by a processor assembly consistent with present principles to infer game actions based on both gesture data and eye gaze data.

Continuing the detailed description in reference to FIG. 9, it shows additional example logic that may be executed by one or more devices alone or in conjunction with the logic of FIGS. 7 and/or 8 consistent with present principles. The logic of FIG. 9 incorporates additional factors that may be used to determine a computer game action to execute, such as player gaze direction and game state. The logic of FIG. 9 thus starts at block 900 where the device receives camera input to, at block 902, generate gesture data and eye tracking data based on the camera input. The gesture data may be generated as discussed above (e.g., based on computer vision). The eye tracking data may be generated based on execution of eye tracking software using the camera input to identify a display location/virtual game world location at which the player is looking onscreen.

From block 902 the logic may proceed to block 904. At block 904 the device may provide the gesture data and eye tracking data to an ML model. The ML model may be similar to the one discussed above in some examples, but may also be trained to make inferences about computer game actions to execute based on eye tracking results/ identified graphical objects being gazed at. As such, here the model may be trained using at least one set of data having training pairs of player gesture data, eye gaze data, and respective ground truth game actions to execute for that particular combination of gesture data and eye gaze data.

From block 904 the logic may then proceed to block 906 where the device may also provide game state data as input to the ML model. The game state data might include a current menu state, a current state of a computer game character, a current state of progress within the computer game, a current position within the computer game such as game level and/or virtual world geolocation, and/or a game event.

The game event might be a currently ongoing/transpiring event (e.g., the player is currently battling a boss character or currently exploring a tunnel) or may be a past event that occurred within a threshold amount of time of a current time within the computer game. The threshold amount of time may be non-zero and set as a short period of time sufficient for the gesture data and eye gaze data to still be relevant to the past event. As such, the threshold period of time may be ten seconds in non-limiting examples. But regardless of if the event is current or past, a macro may be more correctly inferred for a given gesture based on the device accounting for contextual game events, improving inference accuracy when an ambiguity might otherwise exist. Thus, for instance, if a gesture is translated potentially to either summoning a horse or drinking a potion but the player's character is currently battling a boss and losing health at more than a threshold rate over time, drinking the potion may be inferred as more relevant to the current event than summoning a horse that would otherwise used to explore the game world in other contexts.

Also note that "current time within the computer game" in reference to the threshold amount of time above may not be actual real-world time in all instances and instead may be time measured as game playout time. So, for example, if the user plays a minute of a game, pauses the game for ten minutes, and then plays another minute of the game, the current time within the computer game would be two minutes instead of twelve minutes.

Thus, note that the logic of FIG. 9 may proceed from block 906 to block 908 for the device to actually execute the ML model to dynamically map the player gesture to the input sequence macro inferred based on the game state data, gesture data, and/or eye gaze data. The macro may therefore be inferred based on one or more of the different game state parameters from above, such as a current state of the computer game virtual character being controlled by the real-life player or a current state of a menu of the computer game.

For instance, the ML model may be executed to infer the input sequence macro based on inputs that are needed to navigate, according to the current menu state, the associated menu itself to a menu item correlated to the player gesture. The current menu state may thus become a previous menu state based on input of the input sequence macro to the computer game (which changes the current menu state), and so subsequent to and based on inputting the input sequence macro to the computer game the device may also be configured to revert the menu to the previous menu state that was the "current" menu state prior to input of the macro.

As for current state of a computer game character as used to infer a macro, this might include current health level, current weapon arsenal, current number of lives left, current skins or other aesthetic character aspects, etc. Thus, for instance, gesture input of a command to drink a health potion may be inferred as a macro while the character's health is below a threshold health level (e.g., 50%), and otherwise only controller button input to drink the potion may be processed and executed by the device. In terms of current arsenal, gesture input may not be translated to use of a certain weapon if that weapon does not currently exist in the character's arsenal, even if that gesture otherwise would be used to infer use of that weapon (and hence input of a macro to command use of that weapon). Likewise, gestures to change skins will not be inferred when the character has no additional skins available, but if other skins are available then the gesture input may dynamically mapped to a macro to change skins. In terms of current number of lives, if the character has more than a threshold non-zero amount of lives remaining for that particular game instance/execution environment, then gesture input may be dynamically mapped to a macro for a game move designated as high-risk. But when the character has less than the threshold amount of lives remaining, the gesture input may not be dynamically mapped to a high-risk macro to preserve remaining character life.

The ML model may also dynamically map player gestures to macros based on a current state of progress within the computer game and/or a current character position within the computer game. So, for instance, the user might not be able to use a gesture to generate a macro to summon a horse if the horse is not yet available at that game stage (current progress) or not able to be summoned in a tunnel (current character position).

Also at block 908 of FIG. 9, the macro from the activation layer might be inferred based on player gaze direction in addition to or in lieu of game state. This may help gain even greater context for what the associated real-life human player is trying to input to the game while performing the gesture. Thus, the macro may be inferred based on correlation to a game action relevant to a game object or game character being gazed at by the player. As such, in one specific example the input sequence macro may be inferred and input to the game to control a first game character based on a determination that the player performing the gesture is looking at the first game character while performing the gesture, and to infer and input a different input sequence macro to the game to control a second game character based on a determination that the player is looking at the second (different) game character while performing the gesture.

But regardless of whether eye gaze input is used or not in a particular instance, FIG. 9 also shows that at block 910 the device may actually receive the inference/output from the ML model that indicates the macro and then provide that macro to the computer game to control the computer game according to the input sequence macro.

Also note that at block 910, if the inference output by the ML model indicates no macro is inferred as apposite based on the game state and/or gaze data, the device may present an audible, visual, and/or tactile/vibration indication to the player. The indication may therefore indicate that a command associated with the player's gesture cannot be executed in the current game state and/or based on current gaze direction.

In some examples, from block 910 the logic may then move to block 912 where the device may, as discussed above, revert the current menu state back to a previous menu state if the menu state changed based on input of the macro.

Figure 10:
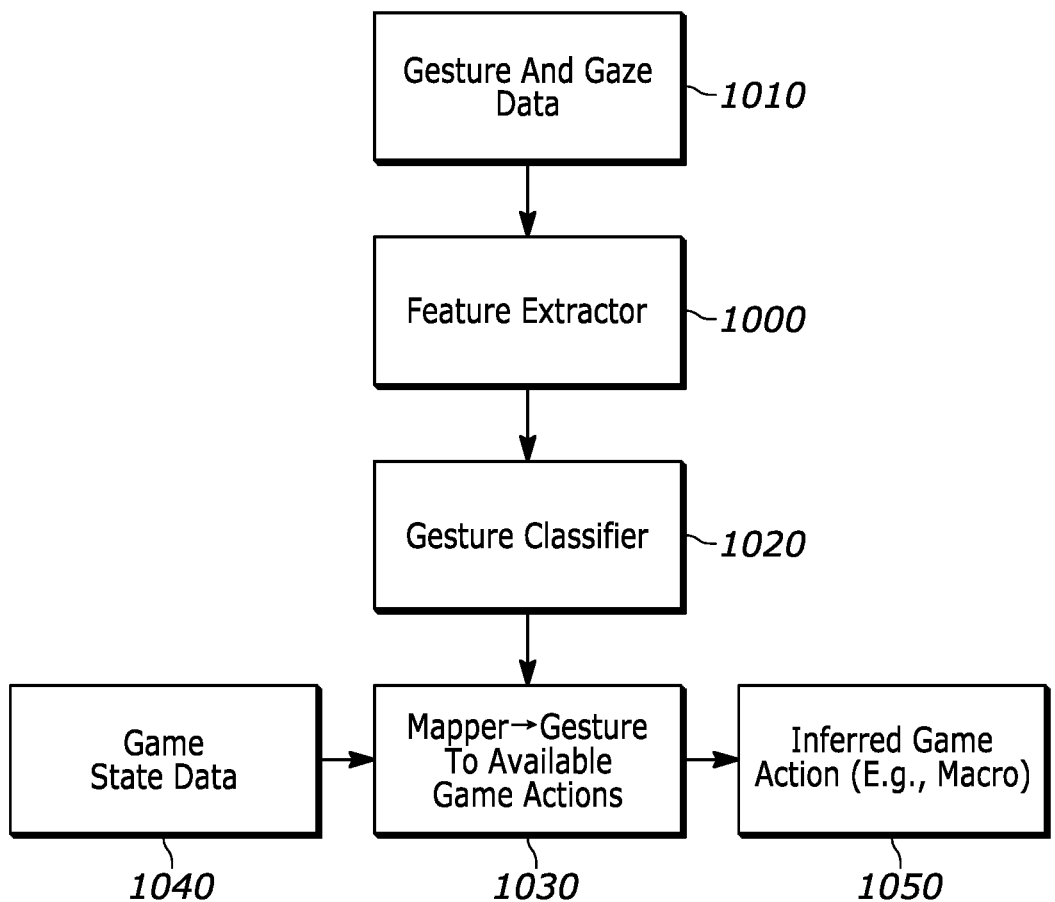
FIG. 10 shows example artificial intelligence software architecture for an ML model consistent with present principles.

Now in reference to FIG. 10, example artificial intelligence architecture for an ML model that may be used consistent with present principles is shown. The architecture includes a feature extractor 1000 into which gesture and/or gaze data 1010 may be input so that features of gestures and eye gazes may be inferred using the extractor 1000. Gesture-related outputs from the feature extractor 1000 may then be input to a gesture classifier 1020 to attempt to classify the gesture as a particular gesture or at least gesture type. The gesture/gesture type output by the classifier 1020 may then be input to a mapper 1030 along with the eye gaze output from the extractor 1000 and along with game state data 1040 provided by the game engine. The mapper 1030 may then process those inputs to render an inference 1050 through an activation layer of the model, with the inference indicating an inferred game action to input to the game either as a macro or as a direct game action command.

Figure 11:
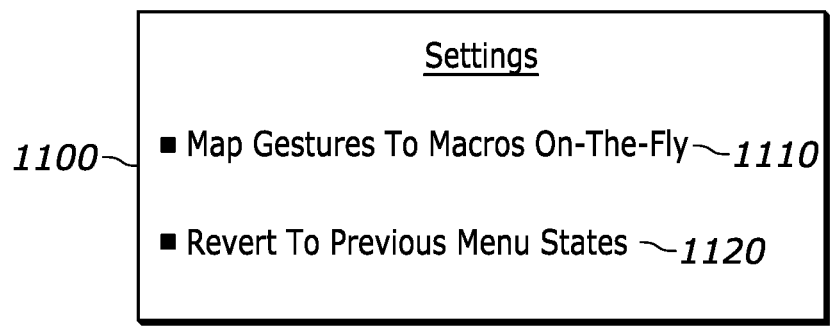
FIG. 11 shows an example settings GUI that may be used to configure one or more settings of a device to operate consistent with present principles.

Now in reference to FIG. 11, an example settings GUI is shown that may be presented on a display to configure one or more settings of a client device, console, computer game, etc. to undertake present principles. The GUI 1100 may be presented based on a user navigating a device or game menu, for example. The example options described below may be selected via touch, cursor, or other input directed to the associated check box per this example.

As shown in FIG. 11, the GUI 1100 may include a first option 1110 that may be selectable a single time to set/configure the device to, in multiple future instances, use an ML model to infer computer game actions to execute based on player gestures even if the player gestures have not been seen before. So, for example, selection of the option 1110 may configure the device to in the future take the actions described above, including those in reference to FIGS. 7 and 9.

As also shown in FIG. 11, the GUI 1100 may include a sub-option 1120. The sub-option 1120 may be selectable to set or enable the device to, when changing menu states per an inferred macro as described above, revert back to a previous menu state that was a current menu state prior to the macro's processing as also described above.

While the particular embodiments are herein shown and described in detail, it is to be understood that the subject matter which is encompassed by the present invention is limited only by the claims.

What is claimed is:

1. An apparatus, comprising:
at least one processor assembly programmed with instructions to:
dynamically map a player gesture to an input sequence macro based on a game state of a computer game;
input the input sequence macro to the computer game to control a first game character based on a determination that a player performing the player gesture is looking at the first game character; and
input the input sequence macro to the computer game to control a second game character based on a determination that the player is looking at the second game character, the second game character being different from the first game character.

2. The apparatus of claim 1, wherein the player gesture comprises a gesture in free space as identified based on input from a camera.

3. The apparatus of claim 1, wherein the input sequence macro comprises a series of inputs related to video game controller input.

4. The apparatus of claim 1, wherein the at least one processor assembly is programmed with instructions to:
execute a trained model to infer the input sequence macro based on a current menu state of a menu of the computer game.

5. The apparatus of claim 4, wherein the at least one processor assembly is programmed with instructions to:
execute the trained model to infer the input sequence macro based on inputs to navigate, according to the current menu state, the menu to an item correlated to the player gesture.

6. The apparatus of claim 5, wherein the current menu state becomes a previous menu state based on input of the input sequence macro to the computer game, and wherein the at least one processor assembly is programmed with instructions to:
subsequent to and based on inputting the input sequence macro to the computer game, revert the menu to the previous menu state.

7. The apparatus of claim 1, wherein the at least one processor assembly is programmed with instructions to:
execute a trained model to infer the input sequence macro based on a current state of one or more computer game characters.

8. The apparatus of claim 1, wherein the at least one processor assembly is programmed with instructions to:
execute a trained model to infer the input sequence macro based on one or more of: a current state of progress within the computer game, a current position within the computer game.

9. The apparatus of claim 1, wherein the at least one processor assembly is programmed with instructions to:
execute a trained model to infer the input sequence macro based on an event of the computer game.

10. The apparatus of claim 9, wherein the event comprises one or more of: a currently-transpiring event, a past event that occurred within a threshold amount of time of a current time within the computer game.

11. The apparatus of claim 1, wherein the at least one processor assembly is programmed with instructions to:
dynamically map the player gesture to the input sequence macro based on tracking the eyes of the player performing the player gesture.

12. A system, comprising:
at least one computer medium that is not a transitory signal and that comprises instructions executable by at least one processor assembly to:
execute a machine learning (ML) model to translate a free space gesture to a sequence of controller inputs based on a game state of a computer game, wherein the game state is a current game state, the sequence of controller inputs being an output of the ML model that is generated based on input to the ML model of data associated with the free space gesture;
input the translated sequence of controller inputs to the computer game; and
responsive to the current game state being an inapposite game state for executing the computer game in conformance with the translated sequence of controller inputs, present an indication to a player of the computer game that a command associated with the free space gesture cannot be executed in the current game state.

* * * * *